INVENTOR.
Julian H. Sano

INVENTOR.
Julian H. Sano
BY Howard G. Russell
his ATTORNEY

June 23, 1959     J. H. SANO     2,892,170
PRESSURE TRANSDUCER NONRESPONSIVE TO VIBRATIONS
Filed July 24, 1958     5 Sheets-Sheet 3

INVENTOR.
Julian H. Sano
BY Howard G. Russell
his ATTORNEY

INVENTOR.
Julian H. Sano

June 23, 1959  J. H. SANO  2,892,170
PRESSURE TRANSDUCER NONRESPONSIVE TO VIBRATIONS
Filed July 24, 1958  5 Sheets-Sheet 5

INVENTOR.
Julian H. Sano
BY Howard G. Russell
his ATTORNEY

United States Patent Office 2,892,170
Patented June 23, 1959

2,892,170

PRESSURE TRANSDUCER NONRESPONSIVE TO VIBRATIONS

Julian H. Sano, Morristown, N.J., assignor to Colvin Laboratories, Inc., East Orange, N.J., a corporation of New Jersey Application July 24, 1958, Serial No. 750,772

10 Claims. (Cl. 338—42)

This invention relates to improvements in transducers for translating the magnitude of physical conditions, as sensed by an appropriate sensing element, into electrical values, which may then be transmitted to a remote point and employed for operating an indicator, a control device or other mechanism.

Certain sensing elements, such as metal diaphragms, bi-metallic strips, etc. are inherently spring systems, and, as such, respond to vibrations produced by sources entirely unrelated to the physical condition to be ascertained. As a result, undesired fluctuations are produced in the output of the transducer.

The principal object of the present invention is the reduction or elimination of the effect of such vibrations on the transducer without reducing its sensitivity.

The invention is based on the recognition that the influence of vibrations, particularly vibrations of a relatively high frequency range to which sensing elements, such as diaphragm capsules, tend to respond because of their natural frequency, may be eliminated, without the use of conventional damping means, by providing a mechanical system which has either a frequency outside the range of the disturbing frequencies, or has no natural frequency at all and does not tend to vibrate.

According to the invention, a mechanical system is employed comprising two balanced and counterrotating masses which are rotated by the sensing element in response to changes in the physical condition to be ascertained, but which do not respond to the relatively high frequencies tending to disturb the function of the transducer. The mechanical system employed by the invention is so constructed as to be equally non-responsive to acceleration. This is an important feature in the use of the improved transducers on aircraft, road or rail vehicles.

This application is a continuation-in-part of my earlier application Serial No. 671,333, filed July 11, 1957, whose prosecution is now abandoned without abandonment of the invention disclosed therein.

The various objects, features and advantages of the invention will appear more fully from the detailed description which follows, accompanied by drawings showing, for the purpose of illustration, a preferred embodiment of the invention. The invention also resides in certain new and original features of construction and combination of elements hereinafter set forth and claimed.

Although the characteristic features of this invention which are believed to be novel will be particularly pointed out in the claims appended hereto, the invention itself, its objects and advantages, and the manner in which it may be carried out may be better understood by referring to the following description taken in connection with the accompanying drawings forming a part of it, in which:

In the following description and in the claims various details will be identified by specific names for convenience. The names, however, are intended to be generic in their application. Corresponding reference numbers refer to corresponding parts in the several figures of the drawings.

The drawings accompanying, and forming part of, this specification disclose the specific application of this invention to a pressure transducer for the purpose of explanation of the broader aspects of the vibration-suppressing system, but it is understood that details may be modified in various respects without departure from the principles of the invention, and that the invention may be applied to other devices and other sensing elements than the one shown.

Figure 1:
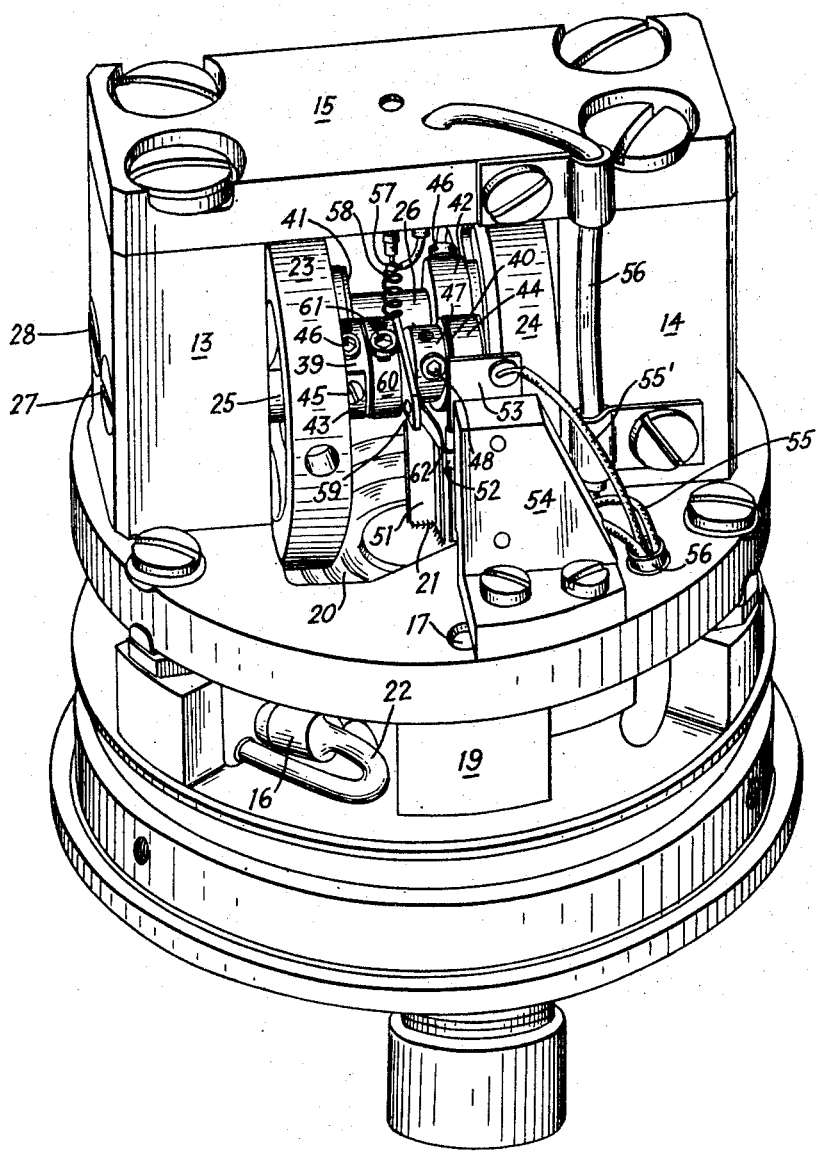
Fig. 1 is a perspective view of a pressure transducer embodying the invention.
Figure 2:
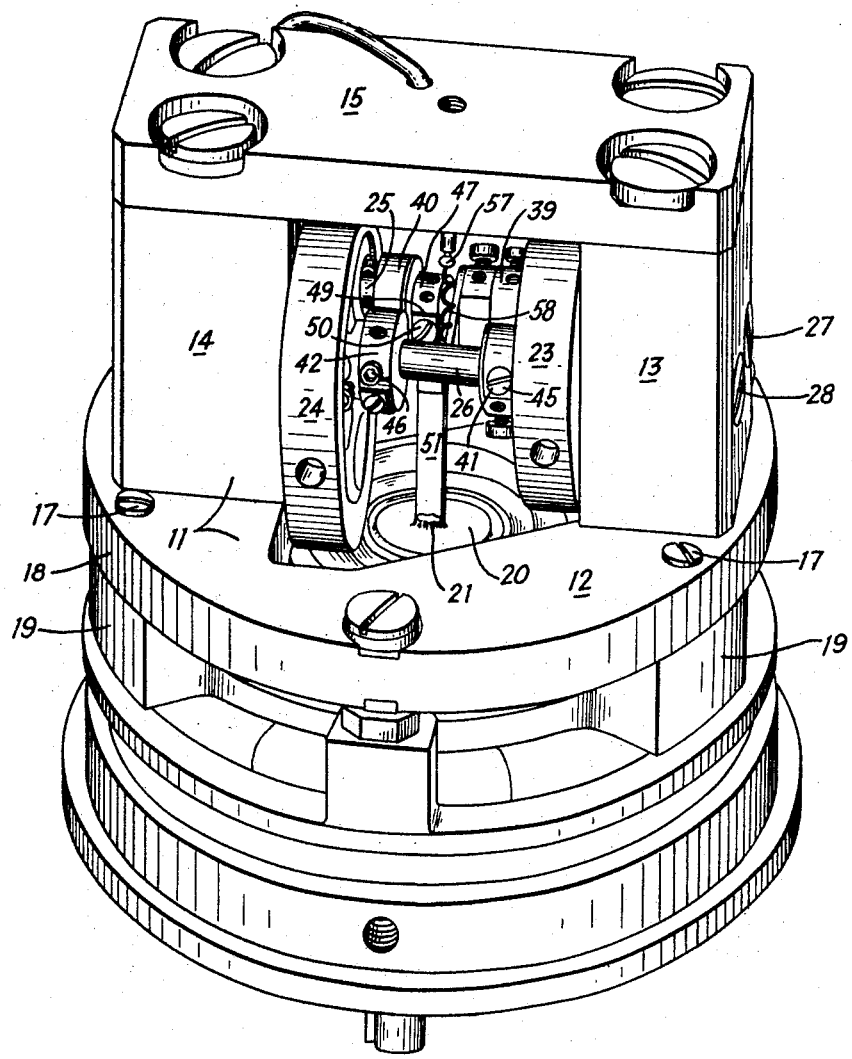
Fig. 2 is a perspective view of the instrument of Fig. 1, as viewed from the opposite side.

The pressure transducer shown in Figs. 1 and 2 comprises a base 11 consisting of a base plate 12, standards 13, 14, and a top plate 15.

A diaphragm capsule or chamber 16 is mounted to the underside of the base 12 by bolts 17. The bottom and sides of the capsule are formed by a body 18 having three legs 19 through which the bolts 17 extend. The capsule is closed at the top by a metallic corrugated diaphragm 20 having a central boss 21. The diaphragm capsule of the illustrated instrument is evacuated, and a sealed tube connection leading into the interior of the diaphragm capsule is visible at 22 in Fig. 1.

A pair of balanced masses 23 and 24 shaped in the form of fly-wheels are mounted on shafts 25 and 26. The ends of the shaft 25 are supported in bearings 27, and the shaft 26 is supported in bearings 28 within the standards 13 and 14.

Figure 3:
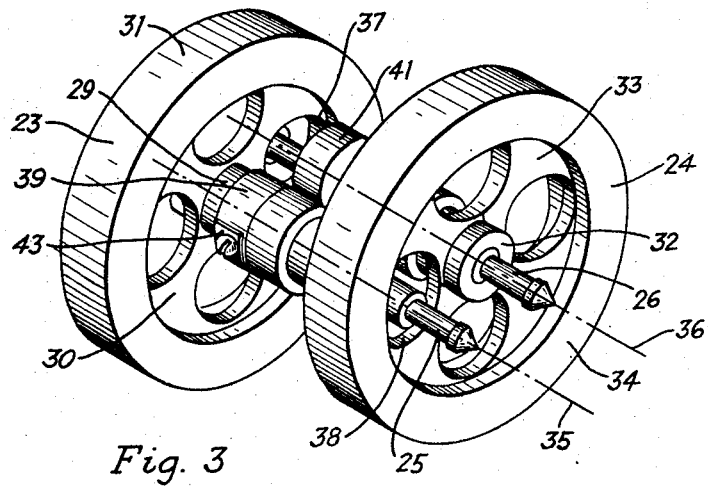
Fig. 3 is a perspective view of certain elements of the apparatus shown in Figs. 1 and 2.

The shape of the massses 23 and 24 and the shaft arrangement are best seen in Fig. 3.

The fly-wheel shaped mass 23 has a hub 29 secured to the shaft 25, and spokes 30 extend from the hub 29 to the rim 31 of the fly-wheel.

The fly-wheel shaped mass 24 has a hub 32 secured to the shaft 26 and spokes 33 extend from the hub 32 to the rim 34.

The axis of the shaft 25 is indicated at 35 and the axis 36 of the shaft 26 is substantially parallel to, but spaced from, the axis 35. The shaft 26 extends through the space 37 between two spokes of the fly-wheel shaped mass 23, and, similarly, the shaft 25 extends through the space 38 between two spokes of the fly-wheel-shaped mass 24. The illustrated arrangement permits each wheel to rotate about 15 degrees in either direction before striking the shaft of the other wheel. This is sufficient for the present purpose, but it is obvious that freedom for greater rotational movement may be provided by an appropriate shaping of the spaces between the spokes and by appropriate selection of the number of spokes.

The fly-wheel-shaped masses 23 and 24 are coupled for counterrotation. While this may be accomplished by gears, it is preferred to employ a tape arrangement which is free from back-lash and practically free from friction. The mechanical principle of such a coupling connection is known per se, and comprises basically a figure-eight arrangement of wire, cable, or tape in which a first portion extends from a point above the axis of rotation of one rotatable element to a point below the axis of rotation of the other element, and a second portion extends from a point below the axis of rotation of the one element to a point above the axis of rotation of the other element.

In the illustrated form of apparatus the coupling connection comprises a pair of cylindrical drums 39 and 40 secured to the shaft 25, and a further pair of drums 41 and 42 secured to the shaft 26. Drum 41 is in line with, and opposite of, drum 39, and drum 42 is opposite of, and in line with, drum 40. A first tape 43 extends about the lower portion of the periphery of the drum 39 and about the upper portion of the periphery of the drum 41. A further tape 44 extends about the upper portion of the periphery of the drum 40 and about the lower portion of the periphery of the drum 42. Looking at the shafts endwisely from the right in Figs. 1 and 3, tape 43 extends counterclockwisely about drum 39 and clockwisely about drum 41, and tape 44 extends clockwisely about drum 40 and counterclockwisely about drum 42.

The tapes consist preferably of strips of beryllium copper of a gauge of the order of two thousandths of an inch thickness, and the ends of the strips are secured to the drum by screws 45. Set screws 46 secure the drums to the respective shafts. Instead of beryllium copper, stainless steel or platinum alloy may be used.

Assuming the mass 23 in Fig. 1 turns in the direction "top going," the tape 43 is wound on drum 39 and an equal amount of tape is unwound from drum 41. At the same time an equal amount of tape is unwound from drum 40 and wound on drum 42. The shafts 25 and 26 are thus caused to turn in opposite directions.

The rotatable masses are balanced about their respective axes 35 and 36, so as to remain unaffected by acceleration.

An actuating drum 47 is secured to the shaft 25 by a set screw 48. An actuating tape 49 is secured to the actuating drum 47 by a screw 50, extends about a portion of the periphery of the drum 47 and is fastened with its other end, preferably by soldering, to a rigid post 51 extending upwardly from the central boss 21 of the diaphragm 20.

Assuming that the diaphragm moves in a downward sense (Fig. 2), it tends to unwind the tape from the actuating drum 47 with the result that the fly-wheel-shaped mass 23 rotates in the direction "top coming," whereas the mass 24 rotates in the direction "top going."

A potentiometer winding 52 on an insulating core 53 is mounted on the base 11 by means of a bracket 54. Leads 55 and 55' extend to the ends of the winding. A further lead 56 extends to an insulated post 57 extending downwardly from the top plate 15. A flexible connection, shown in the figures as having the form of a helical spring 58, extends from the post to a wiper arm 59. The wiper arm has a hub portion 60 secured to the shaft 25 by a set screw 61. The wiper arm further comprises a brush portion 62 in contact with the potentiometer winding 52.

The helical connecting spring 58 serves the double purpose of providing an electrical connection between the post 57 and the brush portion of the wiper arm, and of biasing the rotatable masses slightly in a direction of rotation corresponding to an upward movement of the diaphragm 20, so as to prevent buckling of the thin actuating tape 49.

The operation of the device is as follows:

An increase in the pressure of the atmosphere surrounding the diaphragm capsule leads to a downward movement of the center portion of the diaphragm including the post 51. As a result the mass 23 is rotated in the direction "top coming" (Fig. 2) and the mass 24 is rotated through equal arc in the opposite sense. The rotation of the shaft 25 causes the end of the potentiometer arm to move upwardly producing a corresponding change in voltage between the wiper brush 62 and the top terminal of the winding to which lead 55' extends.

It is obvious that the diaphragm 20 may also serve as an element for measuring differential pressure. The higher of the two pressures may, for example, be applied to the back side of the diaphragm through the tube connection 22, and the lower of the two pressures may be applied to the top side of the diaphragm by introduction of the pressure into a housing (not shown) fitting over the mechanism.

An increase in the pressure difference leads to an upward deflection of the diaphragm, an upward movement of the center post 51 and, correspondingly, a movement of the wiper brush 62 in the opposite direction than above described.

Forces tending to vibrate the diaphragm are without effect on the position of the potentiometer arm and do not produce oscillations of the arm because the heavy masses 23 and 24 are incapable of responding to vibrations of the frequency range to which the diaphragm 20 responds. The instrument is equally unaffected by acceleration because of the balance of the masses about their respective axes.

Figure 4:
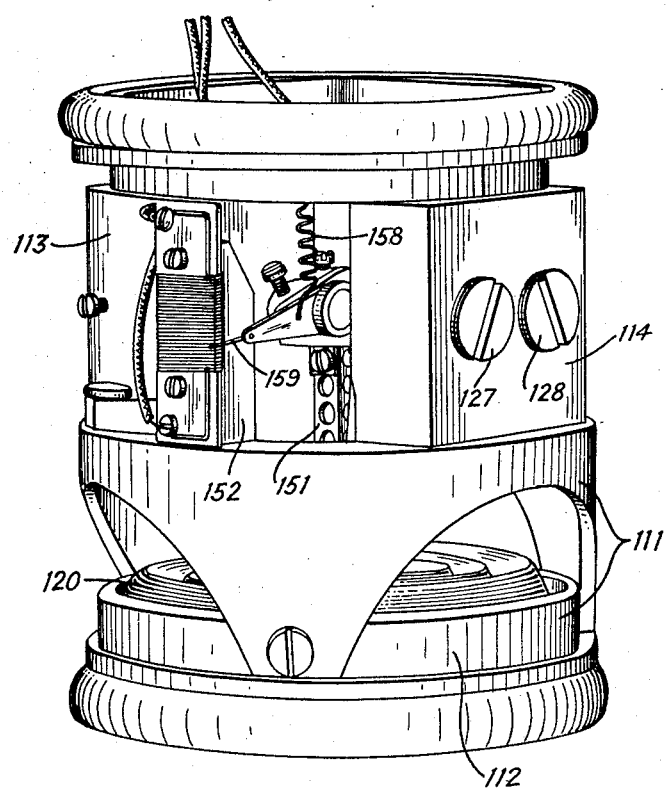
Fig. 4 is a perspective front view of a modified embodiment of the invention.
Figure 5:
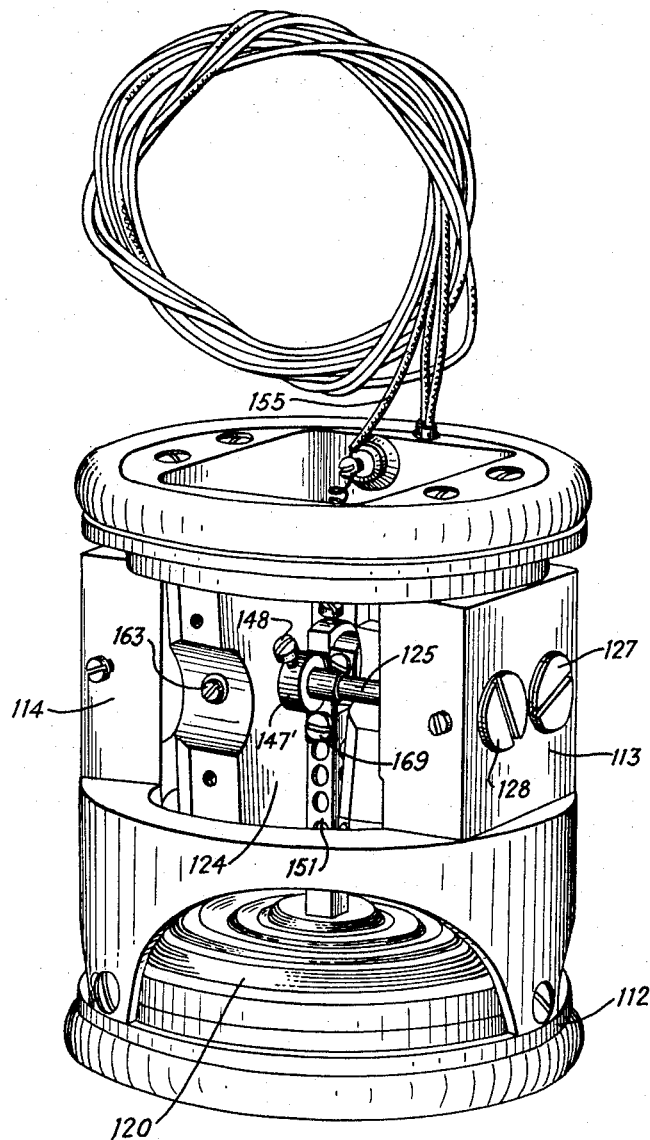
Fig. 5 is a perspective view of the instrument of Fig. 4 viewed from the opposite side.
Figure 6:
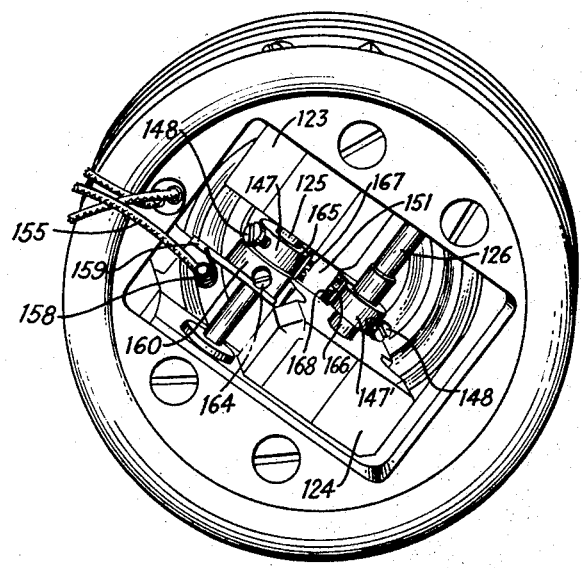
Fig. 6 is a perspective end view of the instrument of Fig. 4.

The instrument shown in Figs. 4, 5 and 6 comprises a base 111 including a base plate 112 supporting the diaphragm capsule 120. Standards 113 and 114 support bearings 127, 128 for shafts 125 and 126 on which substantially hourglass shaped masses 123 and 124 are fixedly mounted by means of set screws 163.

The shaft 125 carries the wiper arm 159 having a hub portion 160 held on the shaft by a set screw 164. The wiper arm brushes over a potentiometer winding 152, best visible in Fig. 4. A helical spring connection 158 extends from the wiper arm 159 to the respective lead 155.

The diaphragm 120 carries a center post 151 from which two flexible tapes 165 and 166 extend to the periphery of actuating drums 147 and 147' on the shafts 125 and 126, respectively. The drums 147 and 147' are fixed on the shafts by set screws 148. The tapes extend about a portion of the periphery of the drums 147 and 147' to which they are secured by screws 167 and 168. The other ends of the tapes are secured to the post 151 by screws 169.

The tapes cause the shafts 125 and 126 to rotate in opposite directions when the pressure on the diaphragm increases or decreases. Assuming that the movement of the post 151 is downward, the tapes unwind slightly from their respective drums and cause a corresponding rotation of the shafts and of the masses 123 and 124 thereon. A movement of the post 151 in an upward direction causes the tapes to wind up on the drums. The shortness of the tapes makes them sufficiently stiff to prevent buckling. Tests have proved that the illustrated tape connection is satisfactory and reliable for actuating the shafts by the diaphragm as well as an interconnection of the two shafts, so that any tendency of one mass to rotate in one direction in response to outside influences is cancelled by an oppositely directed equal torque set up by the other mass causing the position of the wiper arm to remain unaffected by disturbances and solely responsive to the movements of the diaphragm.

The masses 123 and 124 are incapable of responding to vibrations of the frequency range to which the diaphragm 120 responds.

In the claims the term "even directed" is employed as a generic term including an arrangement in which the axes of the masses are parallel and an arrangement in which they are in line, in accordance with the dictionary definition in Merriam-Webster's dictionary—"even: (5) In the same plane or in line; parallel."

What is claimed is:

1. A pressure transducer nonresponsive to vibrations comprising, in combination, a base; a first shaft pivotally mounted on said base; a first mass on said shaft, said shaft and mass being balanced about the shaft axis; a second shaft spaced from, and substantially parallel to, said first shaft; a second mass on said second shaft, said second mass and shaft being balanced about the axis of the second shaft; a first tape clockwisely extending about one of said shafts and counterclockwisely about the other shaft; a second tape counterclockwisely extending about said one shaft and clockwisely about said second shaft, the ends of said tape being connected to said shafts for counterrotation of the shafts; a pressure responsive element mounted on said base, said element having a movable wall; link means between said movable wall and one of said shafts for rotating said one shaft in dependence on movements of said wall; a resistance winding on said base; a wiper arm engaging said winding; and means for connecting said wiper arm to one of the shafts for movement relatively to said winding in dependence on the rotative motion of said last named shaft about its axis.

2. A pressure transducer nonresponsive to vibrations comprising, in combination, a base; a pressure responsive element on said base, said element having a movable wall; a first fly-wheel pivotally mounted on said base about a first axis; a second fly-wheel pivotally mounted on said base about a second axis spaced from, but substantially parallel to, said first axis; tape means for connecting said fly-wheels for counterrotation, said tape means including a first tape clockwisely extending about the first axis and counterclockwisely extending about the second axis, and a second tape counterclockwisely extending about said first axis and clockwisely extending about said second axis; link means between said movable wall and one of said fly-wheels for rotating said one fly-wheel in dependence on movements of said wall; a resistance winding on said base; a wiper arm engaging said winding; and means for connecting said wiper arm to one of said fly-wheels for movement relatively to said winding in dependence on the rotative motion of said last named flywheel about its axis.

3. A pressure transducer nonresponsive to vibrations comprising, in combination, a base; a pressure responsive element on said base, said element having a movable wall; a first fly-wheel comprising a hub, spokes and a rim; a first shaft supporting said first fly-wheel; a second flywheel comprising a hub, spokes and a rim; a second shaft supporting said second fly-wheel, said shafts being pivotally mounted on said base, spaced from, and substantially parallel to, each other in such a way that each shaft extends through the space between two spokes of the flywheel mounted on the other shaft; tape means for connecting said fly-wheel for counterrotation, said tape means including a first tape clockwisely extending about said first shaft and counterclockwisely extending about the second shaft, and a second tape counterclockwisely extending about said first shaft and clockwisely extending about said second shaft; link means between said movable wall and one of said fly-wheels for rotating said one fly-wheel in dependence on movements of said wall; a resistance winding on said base; a wiper arm engaging said winding; and means for connecting said wiper arm to one of said fly-wheels for movement relatively to said winding in dependence on the rotative motion of said last named flywheel about its shaft axis.

4. A pressure transducer nonresponsive to vibrations comprising, in combination, a base; a pressure responsive element on said base, said element having a movable wall; a first fly-wheel comprising a hub, spokes and a rim; a first shaft supporting said first fly-wheel; a second fly-wheel comprising a hub, spokes and a rim; a second shaft supporting said second fly-wheel; bearing means on said base for pivotally supporting said shaft in spaced, substantially parallel relation in such a way that each shaft extends through the space between two spokes of the fly-wheel on the other shaft; a first pair of drums on one shaft, a second pair of drums on the other shaft, said second pair being substantially in line with, and opposite, the first pair; a first tape clockwisely extending about one drum of one pair and counterclockwisely about the opposite drum of the other pair; a second tape counterclockwisely extending about the second drum of the one pair and clockwisely about the opposite drum of the other pair, the tapes being connected to said drums for counterrotation of the drums; link means between said movable walls and one of the shafts for rotating said one shaft in dependence of movements of said wall; a resistance winding mounted on said base; a wiper arm engaging said winding, said wiper arm being mounted on one of said shafts for rotation therewith.

5. A transducer nonresponsive to vibrations comprising, in combination, a sensing element having a movable portion movable in response to changes in a physical condition; a base; a first mass; means for supporting said first mass on said base for pivotal motion and balance about a first axis; a second mass substantially equal to said first mass; means for supporting said second mass on said base for pivotal motion and balance about a second axis; means for interconnecting said two masses for counterrotation; link means between said movable portion of the sensing element and one of said masses for imparting to said one mass a rotation in dependence on movement of said portion; a resistance winding mounted on said base; a wiper arm engaging said winding; and means for moving said wiper arm in dependence on the rotative motion of one of said masses about its axis.

6. A transducer nonresponsive to vibrations comprising, in combination, a sensing element having a movable portion movable in response to changes in physical condition; a base; a first mass; means for supporting said first mass on said base for pivotal motion and balance about a first axis; a second mass substantially equal to said first mass; means for supporting said second mass on said base for pivotal motion and balance about a second axis; tape means for interconnecting said two masses for counterrotation, said tape means including a first tape clockwisely extending about said first axis and counterclockwisely extending about said second axis and a second tape counterclockwisely extending about said first axis and clockwisely extending about said second axis; link means between said sensing element and one of said masses for rotation of said one mass by said sensing element; a resistance winding on said base; and a wiper arm connected to one of said masses for sweeping over said winding in dependence on the rotation of said last named mass about its axis.

7. A transducer nonresponsive to vibrations comprising, in combination, a sensing element having a movable portion movable in response to changes in a physical condition; a base; a first mass; means for supporting said first mass on said base for pivotal motion in a first plane and for balance about a first axis; a second mass substantially equal to said first mass; means for supporting said second mass on said base for pivotal motion in a second plane substantially parallel to said first plane and for balance about a second axis; motion transmitting means connected to said movable portion and said masses for pivoting said two masses substantially equally, and in an opposite sense in dependence on the motion of said portion; a resistance winding mounted on said base; a wiper arm engaging said winding; and means for moving said wiper arm in dependence on the rotary motion of one of said masses about its axis.

8. A transducer nonresponsive to vibrations comprising, in combination, a sensing element having a movable portion movable in response to changes in a physical condition; a base; a first mass; means for supporting said first mass on said base for pivotal motion and balance about a first axis; a second mass substantially equal to said first mass; means for supporting said second mass on said base for pivotal motion and balance about a second axis substantially parallel to said first axis; motion transmitting means operatively connecting said movable portion and said masses for imparting to said masses substantially equal pivotal motion in an opposite sense in dependence on the movement of said portion; a resistance winding mounted on said base; a wiper arm engaging said winding; and means for moving said wiper arm in dependence on the movement of said movable portion.

9. A transducer nonresponsive to vibrations comprising, in combination, a sensing element having a movable portion movable in response to changes in a physical condition; a base; a first shaft rotatably mounted on said base; a first mass fixedly mounted on said shaft; a first drum fixedly mounted on said shaft; a second shaft rotatably mounted on said base even-directed with said first shaft; a second mass fixedly mounted on said second shaft; a second drum on said second shaft; operating means between said movable portion and said shaft for rotating said shafts in counterrotation in dependence on movements of said portion, said operating means including flexible tapes secured to said portion and to said drums, respectively, said tapes being flexed about a portion of said drums adjacent the point of attachment; a resistance winding mounted on said base; a wiper arm engaging said winding; and means for moving said wiper arm in dependence on the rotary motion of at least one of said shafts.

10. A pressure transducer nonresponsive to vibrations comprising, in combination, a diaphragm; a stem on said diaphragm movable in response to changes in pressure acting on the diaphragm; a base supporting said diaphragm; a first shaft rotatably mounted on said base; a first mass fixedly mounted on said shaft; a first drum fixedly mounted on said shaft; a second shaft rotatably mounted on said base even-directed with said first shaft; a second mass fixedly mounted on said second shaft; a second drum fixedly mounted on said second shaft; a pair of flexible tapes secured to said stem and said drums, respectively, for rotating said drums in counterrotation in dependence on movements of said stem, said tapes being flexed about a portion of said drums adjacent the point of attachment; a resistance winding mounted on said base; a wiper arm engaging said winding; and means for moving said wiper arm in dependence on the rotary motion of at least one of said shafts.

No references cited.